US006285399B1

(12) United States Patent
Tao

(10) Patent No.: US 6,285,399 B1
(45) Date of Patent: Sep. 4, 2001

(54) SYSTEM AND METHOD FOR GENERATING TIMING SIGNALS IN AN ELECTRONIC IMAGING DEVICE

(75) Inventor: Douglas K. Tao, San Jose, CA (US)

(73) Assignee: FlashPoint, Technology, Inc., San Jose, CA (US)

( * ) Notice: Subject to any disclaimer, the term of this patent is extended or adjusted under 35 U.S.C. 154(b) by 0 days.

(21) Appl. No.: 08/891,857

(22) Filed: Jul. 9, 1997

(51) Int. Cl.[7] .................................................. H04N 3/14
(52) U.S. Cl. ............................................................ 348/312
(58) Field of Search .................................. 348/231, 229, 348/303, 304, 312, 319, 222, 230, 296, 297, 320, 321, 322, 207; 250/208.1

(56) References Cited

U.S. PATENT DOCUMENTS

| | | | |
|---|---|---|---|
| 4,158,208 | * 6/1979 | Dischert | 348/207 |
| 4,234,890 | * 11/1980 | Astle et al. | 348/223 |
| 4,907,089 | * 3/1990 | Yamaguchi et al. | 348/312 |
| 5,040,070 | * 8/1991 | Higashitsutsumi et al. | 348/312 |
| 5,144,445 | * 9/1992 | Higashitsutsumi | 348/312 |
| 5,253,071 | * 10/1993 | Mackay | 348/352 |
| 5,287,192 | * 2/1994 | Iizuka | 348/311 |
| 5,436,659 | * 7/1995 | Vincent | 348/246 |
| 5,442,465 | * 8/1995 | Compton | 250/208.1 |
| 5,489,945 | * 2/1996 | Kannegundla et al. | 348/312 |
| 5,757,427 | * 5/1998 | Miyaguchi | 348/312 |
| 5,767,904 | * 6/1998 | Miyake | 348/312 |
| 5,828,406 | * 10/1998 | Parulski et al. | 348/220 |
| 5,845,166 | * 12/1998 | Fellegara et al. | 348/64 |

* cited by examiner

Primary Examiner—Wendy R. Garber
Assistant Examiner—Aung S. Moe
(74) Attorney, Agent, or Firm—Sawyer Law Group LLP

(57) ABSTRACT

A system and method for generating timing signals in an electronic imaging device includes a horizontal timing generator with a first programmable memory for storing a set of timing information and a vertical timing generator with a second programmable memory for providing a set of control information which is used to selectively generate the timing signals from the set of timing information in the first programmable memory.

8 Claims, 10 Drawing Sheets

226

SYSTEM AND METHOD FOR GENERATING TIMING SIGNALS IN AN ELECTRONIC IMAGING DEVICE

BACKGROUND OF THE INVENTION

1. Field of the Invention

This invention relates generally to electronic imaging devices and more particularly to a system and method for generating timing signals in an electronic imaging device.

2. Description of the Background Art

The efficient operation and use of electronic imaging devices provide computer users with new and effective ways to capture and process various types of image data. Electronic imaging devices typically include special electronic image sensors which convert a selected image into electronic data. These electronic image sensors conventionally include a series of discrete picture elements (or pixels) which convert light reflected from a photographic target into electrical energy that is then shifted out of the image sensor device. Due to the complexity of the high-speed process involved in shifting captured image data out of the image sensor, electronic imaging devices require a series of precise timing pulses to successfully gate the image data from the image sensor. Electronic imaging devices (such as digital cameras) typically include a timing generator device which effectively generates and provides the precise timing pulses to the electronic image sensor.

Referring now to FIG. 1, a block diagram of a conventional fixed timing generator device 60 is shown. The FIG. 1 timing generator 60 includes fixed timing module 1 (62) through fixed timing module "N" (68) which each generate a discrete and unchangeable output signal. For example, timing module 1 (62) includes a state machine 74 which receives a high-speed clock signal on line 70 and responsively provides an output to a first input of AND gate 76. A gate signal on line 72 is applied to a second input of AND gate 76 to produce a fixed output signal on line 78. The FIG. 1 timing generator 60 thus produces a series of fixed timing signals which are specifically designed to operate with a particular corresponding image sensor device. Because of their dedicated functionality, conventional fixed timing generators 60 therefore exhibit a significant lack of flexibility.

Other conventional timing generators use various other techniques to generate programmable timing signals. For example, one prior art timing generator is limited to OR-tying several pulse generation modules together. This approach limits the number of transitions on any one output and thus prevents dynamically changing the number of transitions during pulse signal generation. Another prior art timing generator system requires a central processing unit to generate a specific interrupt signal so that the system software can responsively manipulate a specific timing pulse. This approach is excessively software intensive, since the software must repeatedly access and process the timing signals on a continuing basis.

Electronic image sensor devices are currently evolving to become increasingly more complex and are thus requiring timing generators with more advanced capabilities and greater flexibility. Therefore, an improved system and method are needed for generating timing signals in an electronic imaging device.

SUMMARY OF THE INVENTION

In accordance with the present invention, a system and method are disclosed for generating timing signals in an electronic imaging device. In the preferred embodiment of the present invention, a digital camera device includes an electronic image sensor which requires a complex set of timing signals to effectively capture image data. The digital camera therefore also includes a timing application-specific integrated circuit (timing ASIC) which generates a set of precise timing signals necessary to control and synchronize the electronic image sensor within the digital camera.

In the preferred embodiment, the timing ASIC includes a horizontal timing generator and a vertical timing generator which interact to provide timing signals to the image sensor, in accordance with the present invention. In operation, the digital camera loads a timing ASIC configuration module to configure individual random-access memories (RAM) in both the horizontal timing generator and in the vertical timing generator. This programmable capability of the timing ASIC advantageously allows the digital camera to be implemented using a variety of different image sensors.

Next, a pixel clock generator in the timing ASIC generates and provides a high-speed pixel clock signal to the horizontal address generator within the timing ASIC. In response, the horizontal timing generator generates horizontal timing signals based on the contents of the programmable RAM. The horizontal timing signals preferably include a horizontal drive signal which is then provided to drive the vertical address generator.

In response, the vertical timing generator generates vertical timing signals, including a series of selector control signals which are then provided to respective selectors in the horizontal timing generator. The selectors in the horizontal timing generator advantageously select from several different outputs of the programmable RAM (in the horizontal timing generator). Finally, the horizontal timing generator sends the selected timing signals to the electronic image sensor to effectively control and synchronize the capture of image data. In alternate embodiments, the timing signals may also control and synchronize various other components in the digital camera device. The electronic imaging device is thus able to more efficiently and effectively capture image data, in accordance with the present invention.

DETAILED DESCRIPTION OF THE PREFERRED EMBODIMENT

The present invention relates to an improvement in electronic imaging devices, including digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention comprises a system and method for generating timing signals in an electronic imaging device and includes a horizontal timing generator with a first programmable memory for storing a set of timing information and a vertical timing generator with a second programmable memory for providing a set of control information which is used to selectively generate the timing signals from the set of timing information in the first programmable memory.

Figure 1:
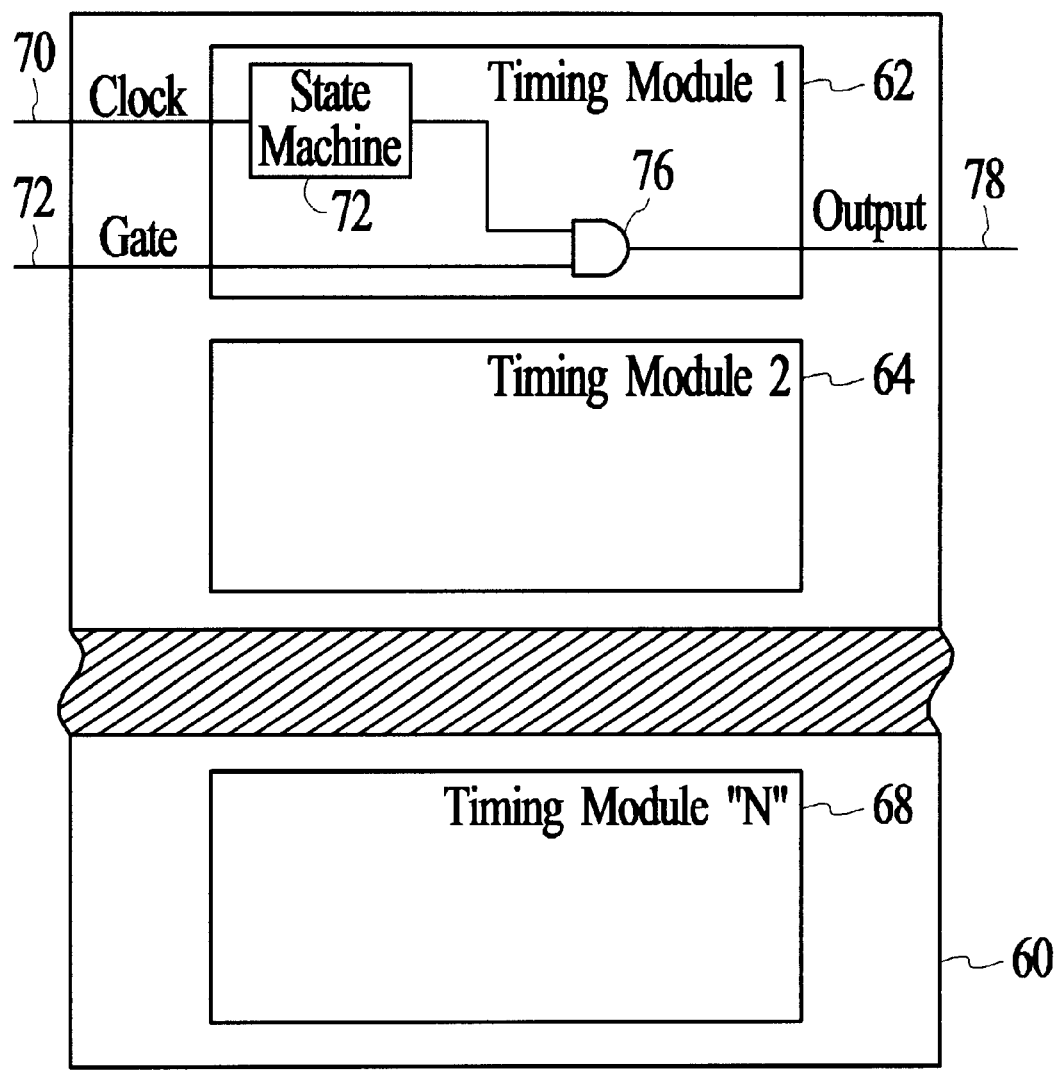
FIG. 1 is a block diagram of a conventional prior art fixed timing generator device.
Figure 2:
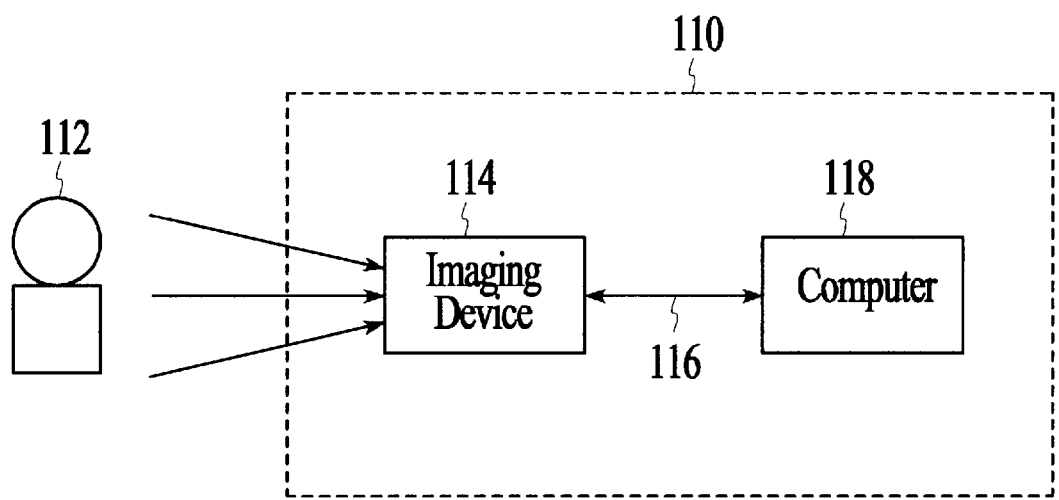
FIG. 2 is a block diagram of a digital camera, according to the present invention.

Referring now to FIG. 2, a block diagram of a digital camera 110 for use in accordance with the present invention is shown. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 3:
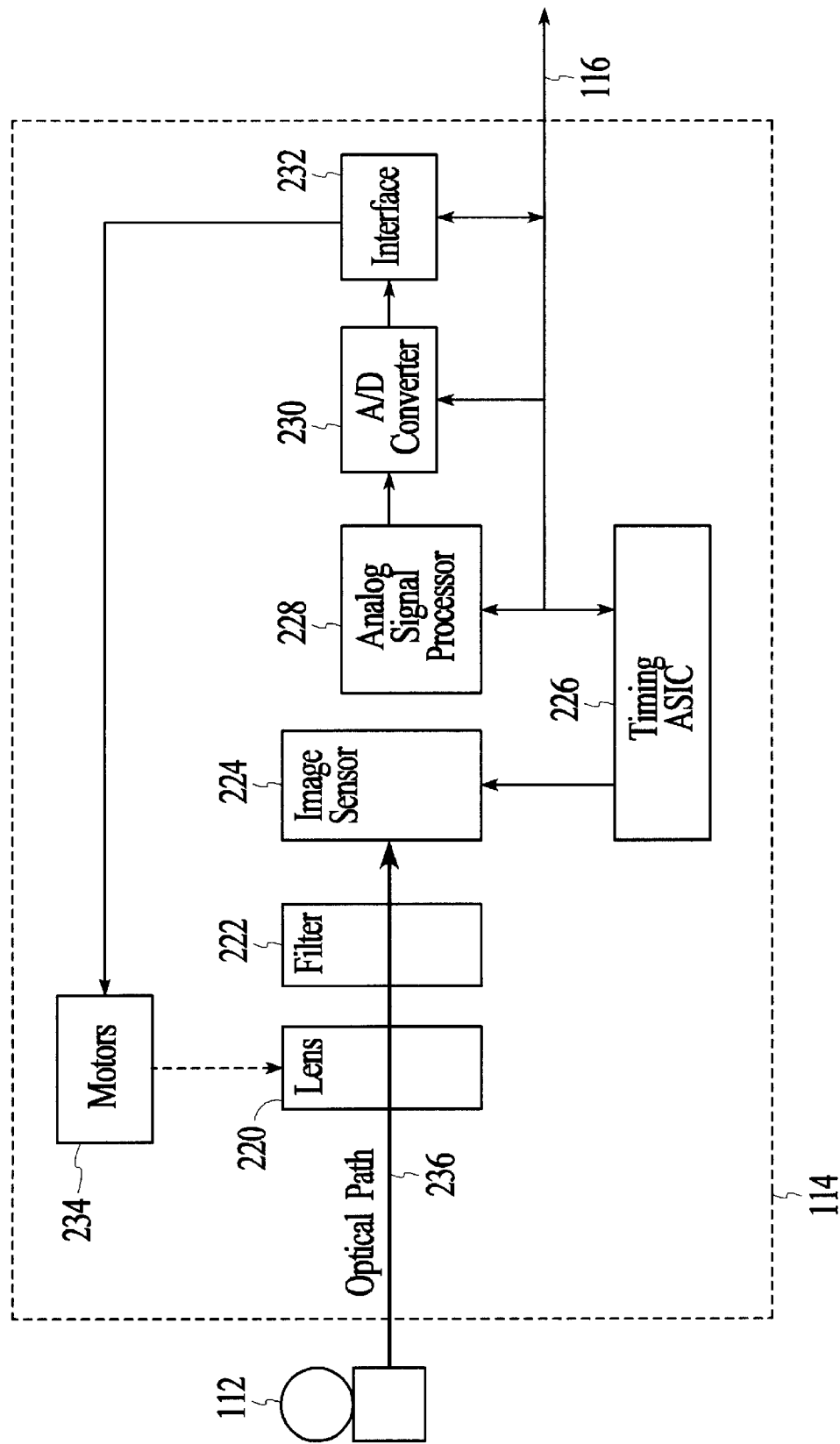
FIG. 3 is a block diagram of one embodiment for the imaging device of FIG. 2.

Referring now to FIG. 3, a block diagram of one embodiment of imaging device 114 is shown. Imaging device 114 typically comprises a lens 220 having an iris, a filter 222, an image sensor 224, a timing application-specific integrated circuit (timing ASIC) 226, an analog signal processor (ASP) 228, an analog-to-digital (A/D) converter 230, an interface 232, and one or more motors 234.

Imaging device 114 captures an image of object 112 via reflected light impacting image sensor 224 along optical path 236. Image sensor 224, which is typically a charge-coupled device (CCD), responsively generates a set of raw image data in CCD format representing the captured image 112. Timing ASIC 226 provides a set of timing signals to effectively synchronize and control the operation of image sensor 224. The raw image data is then routed through timing ASIC 226 to ASP 228, A/D converter 230 and interface 232. From interface 232, the raw image data passes over system bus 116 to computer 118.

Figure 4:
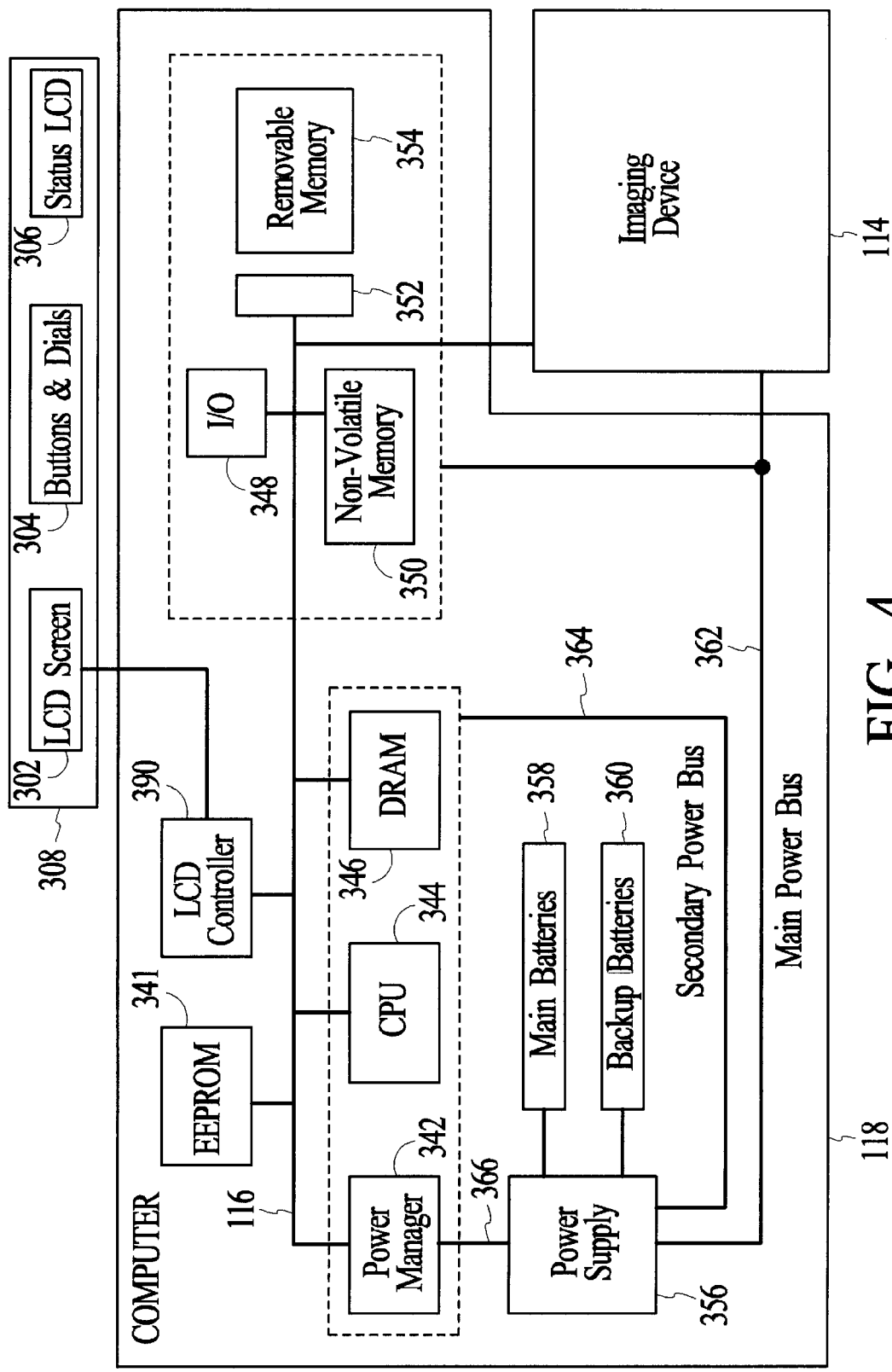
FIG. 4 is a block diagram of one embodiment for the computer of FIG. 2.

Referring now to FIG. 4, a block diagram of one embodiment for computer 118 is shown. System bus 116 provides connection paths between imaging device 114, electrically-erasable programmable read-only memory (EEPROM) 341, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. In alternate embodiments, camera 110 may also readily be implemented without removable memory 354 or buffers/connector 352.

Power manager 342 communicates via line. 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. LCD controller 390 accesses DRAM 346 and transfers processed image data to LCD screen 302 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 304, and an optional status LCD 306, which, in addition to LCD screen 302, are the hardware elements of the camera's user interface 308.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 5:
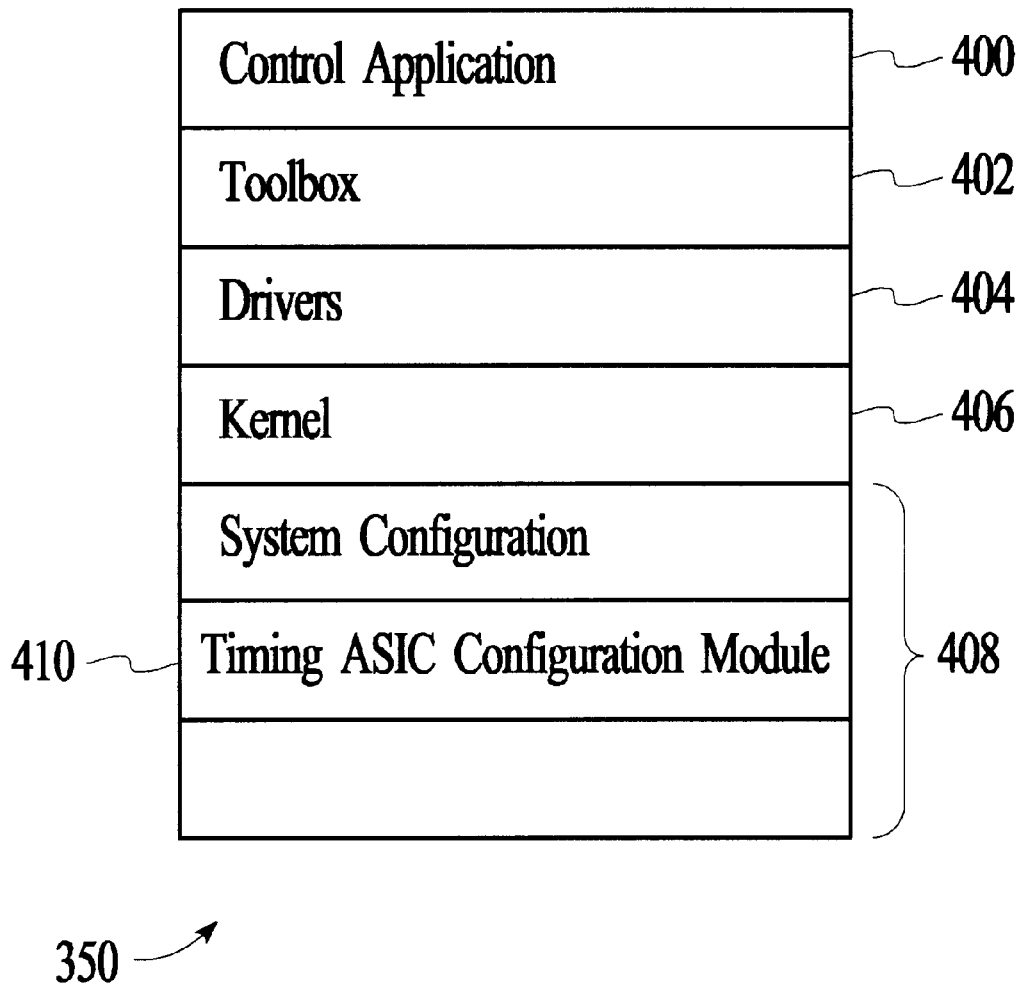
FIG. 5 is a memory map of one embodiment of the non-volatile memory of FIG. 4.

Referring now to FIG. 5, a memory map showing one embodiment of non-volatile memory 350 is shown. In the FIG. 5 embodiment, non-volatile memory 350 includes control application 400, toolbox 402, drivers 404, kernel 406 and system configuration 408. Control application 400 comprises program instructions for controlling and coordinating the various functions of camera 110. Toolbox 402 contains modules to perform selected functions within camera 110.

Drivers 404 control various hardware devices within camera 110 (for example, motors 234). Kernel 406 provides basic underlying services for the camera 110 operating system. System configuration 408 performs initial start-up routines for camera 110, including the boot routine and initial system diagnostics. System configuration 408 also includes a timing ASIC configuration module 410 which contains information for configuring timing ASIC 226, in accordance with the present invention. The operation and effect of timing ASIC configuration module 410 is further discussed below in conjunction with FIGS. 8–10.

Figure 6:
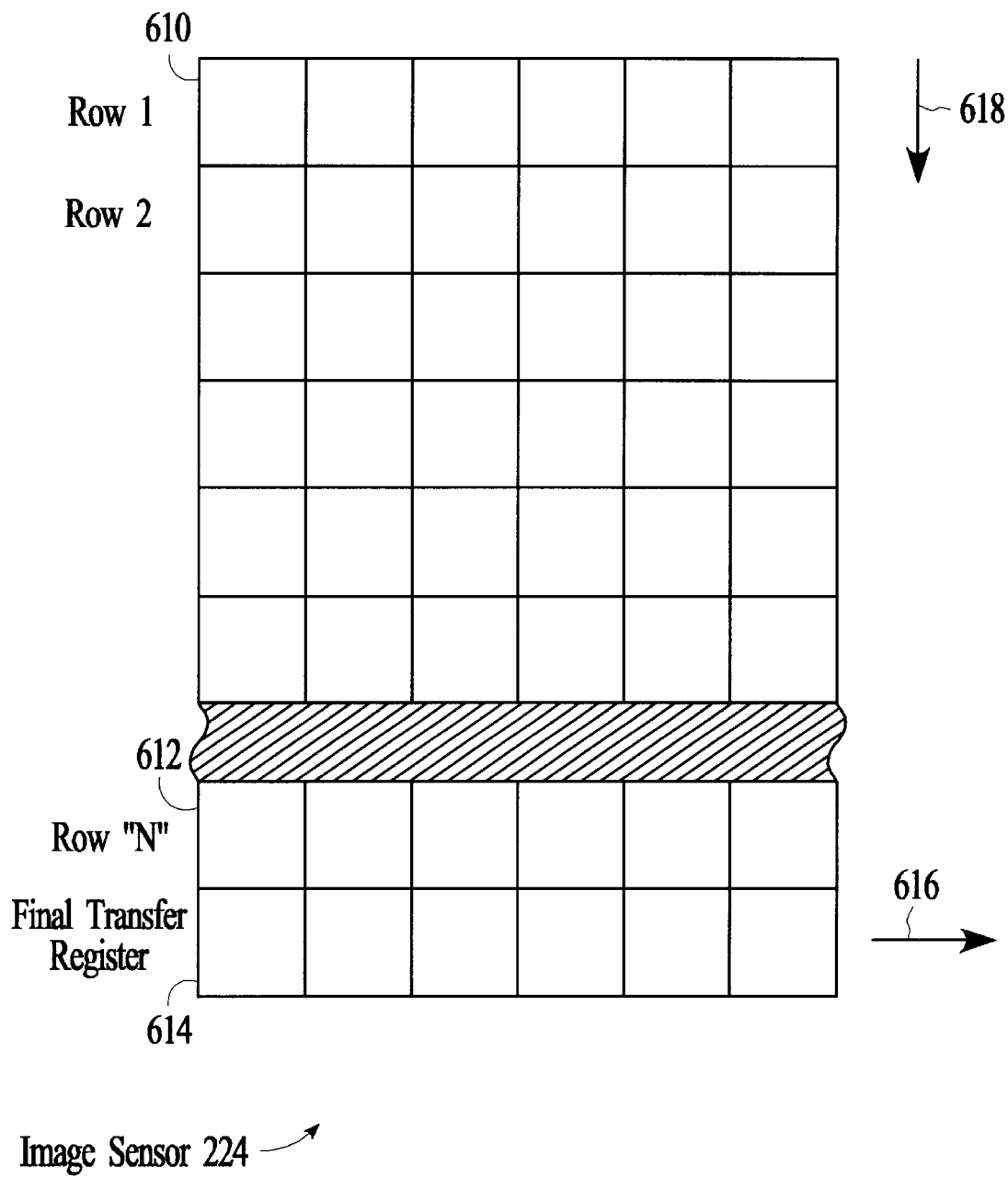
FIG. 6 is a diagram of an image sensor device, according to the present invention.

Referring now to FIG. 6, a diagram of image sensor 224 (FIG. 3) is shown, in accordance with the present invention. The FIG. 6 image sensor 224 includes a matrix of picture elements (pixels) arranged horizontally into a row 1 (610) through a row "N" (612) to form a single frame of image information. For reasons of clarity, row 1 (610) through row "N" (612) each contains six picture elements, however, in actual practice, row 1 (610) through row "N" (612) each typically contain a substantially greater number of picture elements.

Below and adjacent to row "N", image sensor 224 includes a final transfer register 614. Each picture element in image sensor 224 is an electrically-chargeable cell which accumulates light energy and converts the light energy to a proportional electrical charge. In operation, image sensor 224 captures a selected image during a user-initiated exposure period and then serially outputs the picture element charges using a "bucket brigade" or "shift-register" technique. Initially, final transfer register 614 is sequentially emptied in the direction shown by arrow 616. Next, row 1 (610) through a row "N" (612) are each shifted down one row in the direction shown by arrow 618. Then, the above process is repeated until the entire image sensor 224 is emptied and ready to capture another set of image data.

Due to the complexity of the high-speed process involved in shifting captured image data out of image sensor 224, camera 110 uses the timing ASIC 226 to effectively generate a series of precise timing pulses and signals which gate the image data from image sensor 224. Examples of the generated timing signals include a horizontal register transfer clock for gating picture elements from final transfer register 614, a vertical register transfer clock for synchronizing the vertically downward shifts of row 1 (610) through row "N" (612), a horizontal drive (HD) signal that occurs after each one of row 1 (610) through row "N" (612) is sequentially shifted out of final transfer register 614, and a vertical drive (VD) signal that occurs after the entire frame of picture elements is shifted out of image sensor 224.

Figure 7:
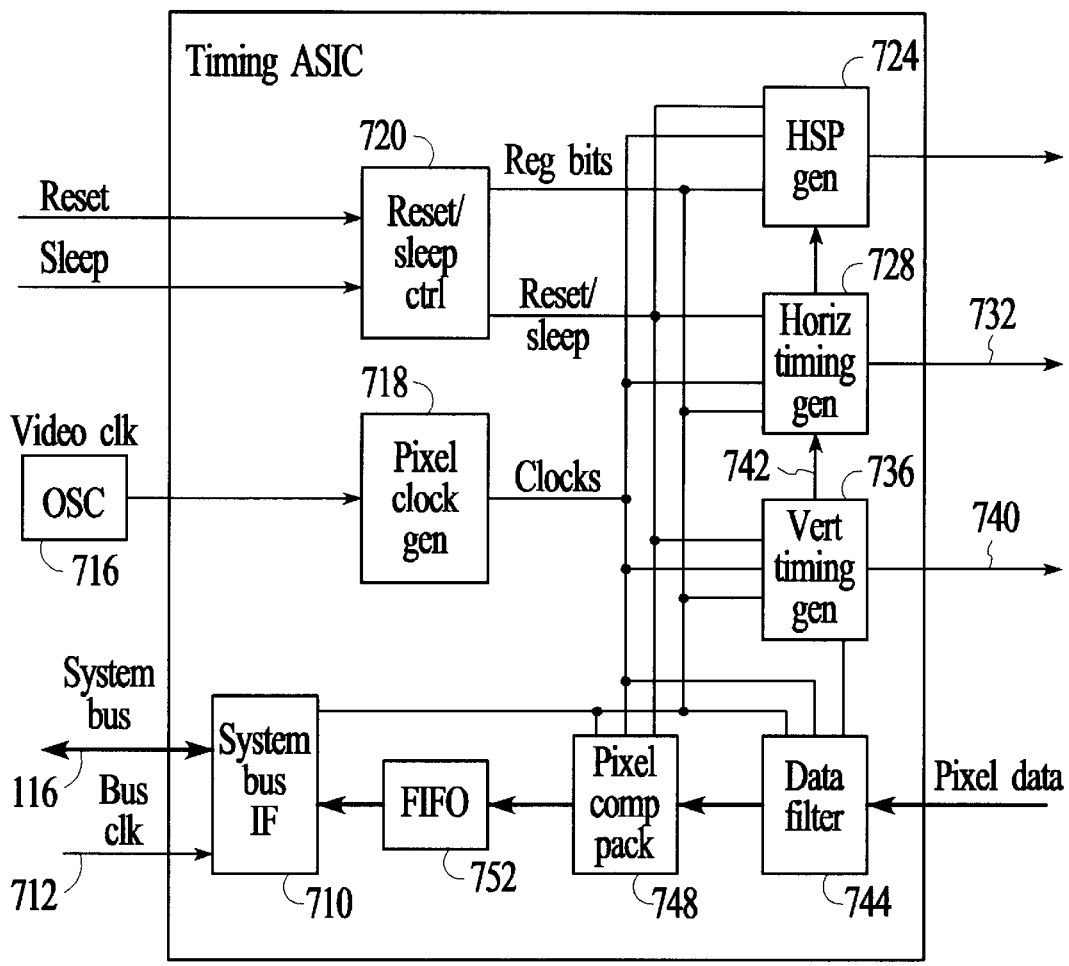
FIG. 7 is a block diagram of the preferred embodiment for the timing ASIC of FIG. 3.

Referring now to FIG. 7, a block diagram of the preferred embodiment for the timing ASIC 226 (FIG. 3) is shown. In the preferred embodiment, timing ASIC 226 includes a system bus interface 710, a pixel clock generator 718, a reset/sleep controller 720, a high-speed pulse (HSP) generator 724, a horizontal timing generator (HTG) 728, a vertical timing generator (VTG) 736, a data filter 744, a pixel compression and packing module 748 and a first-in first-out module (FIFO) 752. In alternate embodiments, the functions of timing ASIC 226 may also be readily accomplished through the use of various other configurations of hardware and/or software devices.

In the preferred embodiment, system bus interface 710 is coupled to system bus 116 and controls all communications between timing ASIC 226 and system bus 116. In operation, pixel clock generator 718 receives a video clock signal from oscillator 716 and responsively generates a series of clock signals including a pixel clock signal which is provided to various modules within timing ASIC 226. Reset/sleep controller 720 generates reset signals to timing ASIC 226 and also generates controlled shutdown and restart signals to place timing ASIC 226 in a sleep mode which has lower power consumption.

HSP generator 724 is responsible for generating all high-speed timing signals for driving the image capture process in image sensor 224. Horizontal timing generator (HTG) 728 is responsible for generating all timing signals that take place within one horizontal line or row of picture elements within image sensor 224. HTG 728 is further discussed below in conjunction with FIGS. 8 and 10. Vertical timing generator (VTG) 736 is responsible for generating all timing signals that take place in multiple horizontal lines or rows of picture elements within image sensor 224. VTG 736 is further discussed below in conjunction with FIGS. 9 and 10.

After image data is captured, data filter 744 receives pixel data from image sensor 224 and programmably selects pixels to provide to pixel compression and packing module 748 which then preferably compresses the 10-bit pixel data into 8-bit elements that are also packed into 32-bit words. FIFO module 752 is a 16-location, 32-bit wide memory device which receives the 32-bit words from pixel compression and packing module 748 and responsively provides the 32-bit words to system bus interface 710 and thus to system bus 116.

Figure 8:
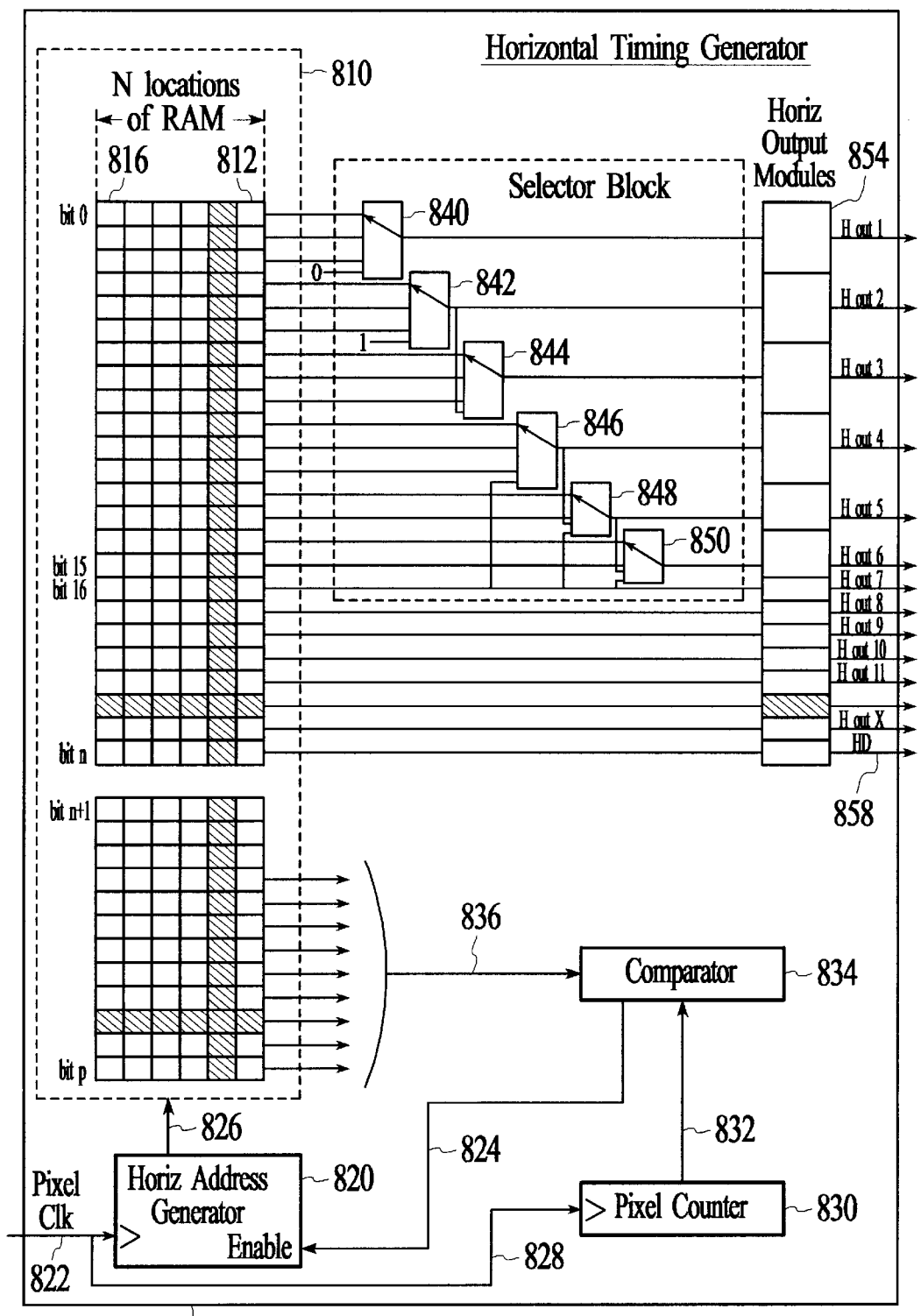
FIG. 8 is a block diagram of the preferred embodiment for the horizontal timing generator of FIG. 7.

Referring now to FIG. 8, a block diagram of the preferred embodiment for the horizontal timing generator (HTG) 728 is shown. In the preferred embodiment, HTG 728 includes random-access memory (RAM) 810, horizontal address generator 820, pixel counter 830, comparator 834, selectors 840 through 850 and horizontal output modules 854.

In the preferred embodiment, RAM 810 is embedded memory which timing ASIC configuration module 410 (FIG. 5) loads with programmable timing information upon startup of camera 110. Because of the programmable nature of RAM 810, timing ASIC 226 may thus advantageously be used in conjunction with various different types of image sensors 224. In alternate embodiments, RAM 810 may also be readily configured by timing information from sources other than configuration module 410. For example, an external host computer (not shown) may provide information to configure RAM 810 via I/O interface 348.

RAM 810 comprises "N" vertical memory locations which range from vertical location zero (812) to vertical location "N" 816. Each vertical location 812 through 816 in RAM 810 contains a sequential series of digital values or "bits" which are divided into three basic functions. For example, bit 0 through bit 15 each provide a selectable output signal having a binary value that corresponds to the associated bit stored in RAM 810. Bit 0 through bit 15 are provided as inputs to a series of selectors 840 through 850 which may then programmably select one of the input bits (from RAM 810) as an output. In alternate embodiments, the present invention may include either a greater or a lesser number of selectors than those shown in the FIG. 8 implementation.

In the preferred embodiment, selectors 840 through 850 are advantageously controlled by two-bit selector control signals generated by vertical timing generator 736 as discussed below in conjunction with FIG. 9. In alternate embodiments, the selector control signals may comprise varying numbers of bits, depending on the number of inputs of selectors 840 through 850. The outputs of selectors 840 through 850 are then provided to horizontal output modules 854 which provide precise edge timing and generate signals H Out 1 through H Out 6 to synchronize and control image sensor 224.

In the preferred embodiment, bit 16 through bit n each provide an unselectable output signal having a binary value that corresponds to the associated bit stored in RAM 810. Bit 16 through bit n are then provided to horizontal output modules 854 which provide precise edge timing and generate signals H Out 7 through H Out X to synchronize and control image sensor 224. Bit n of RAM 810 is provided to a horizontal timing module 854 to generate a horizontal drive signal 858 which is then provided to drive vertical timing generator 736 as discussed below in conjunction with FIG. 9.

In the preferred embodiment, bit n+1 through bit p of RAM 810 provide an absolute pixel count to indicate the time position for sequential transitions to the sets of timing signal values stored in bit 0 through bit n of RAM 810. In other words, timing signal values are specified by values stored in bit 0 through bit n of RAM 810, and the specific times that the transitions occur is stored in bit n+1 through bit p of RAM 810. In practice, bit n+1 through bit p from a vertical location of RAM 810 are provided to a first input of comparator 834 via line 836. For example, horizontal address generator 820 initially supplies an address to vertical location zero 812 in RAM 810. Comparator 834 thus receives bit n+1 through bit p from location zero 812 in RAM 810 via line 836.

The pixel clock signal from pixel clock generator 718 (FIG. 7) is provided to horizontal address generator 820 via line 822, and to pixel counter 830 via line 828. Pixel counter 830 responsively provides a pixel count of the pixel clock to a second input of comparator 834 via line 832. When the pixel count on line 832 equals the current value of bit n+1 through bit p on line 836, then comparator 834 outputs an binary "high" on line 824 to enable horizontal address generator 820. When the enable signal is present, horizontal address generator 820 performs a binary up-count at the rising edge of the pixel clock on line 822 and thus advances to the next sequential vertical memory location in RAM 810. Horizontal address generator 820 supplies the current address to the read data port of RAM 810 via line 826.

In the foregoing manner, horizontal address generator 820 allows digital values in vertical locations zero 812 through "N" 816 to be sequentially read out of RAM 810 at specifically programmable times. Furthermore, horizontal address generator 820 has a programmable count length which repeatedly loops the generated address back to location zero 812 when location "N" 816 of RAM 810 has been reached.

Figure 9:
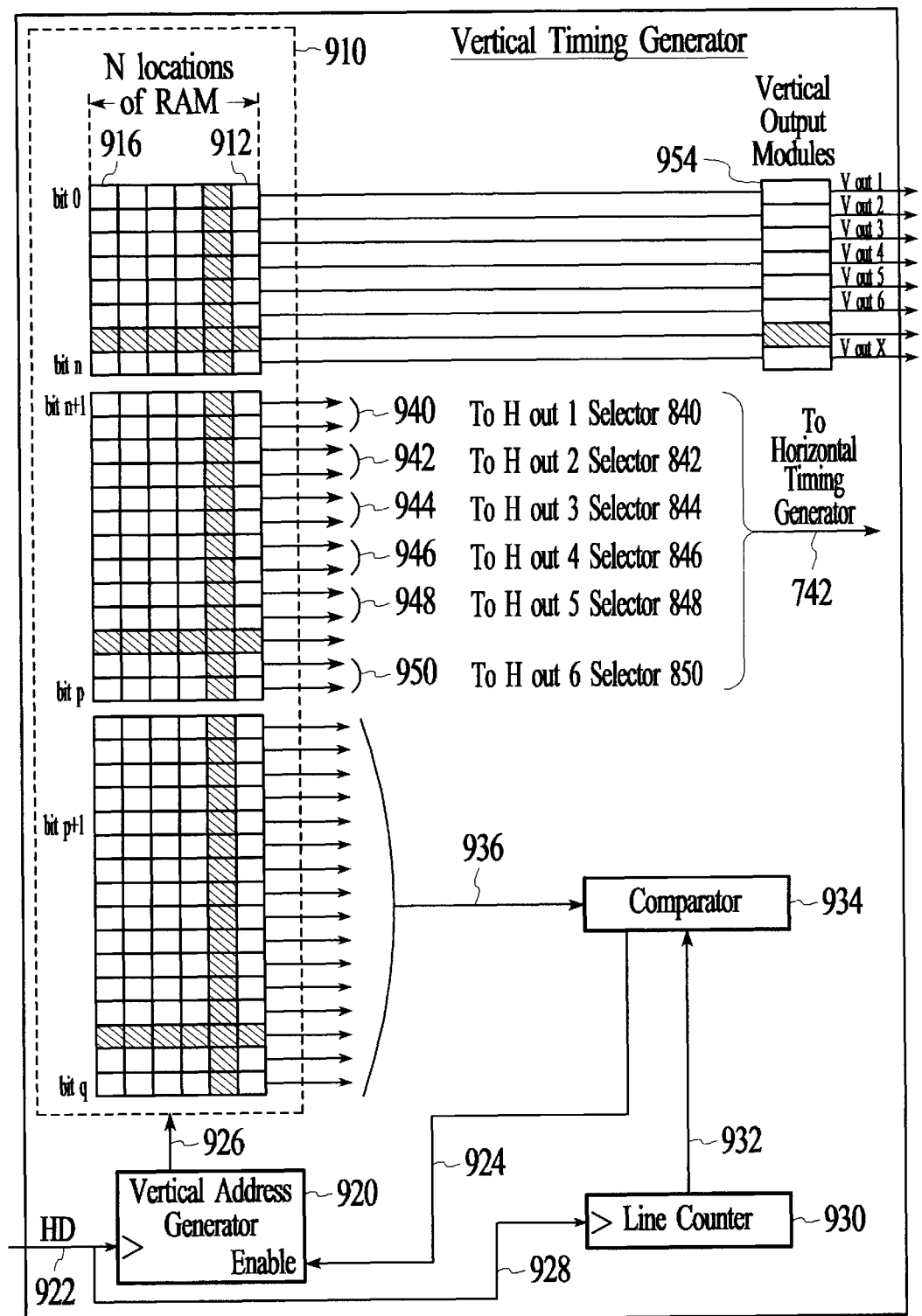
FIG. 9 is a block diagram of the preferred embodiment for the vertical timing generator of FIG. 7.

Referring now to FIG. 9, a block diagram of the preferred embodiment for vertical timing generator (VTG) 736 is shown. In the preferred embodiment, VTG 736 includes random-access memory (RAM) 910, vertical address generator 920, line counter 930, comparator 934 and vertical output modules 954.

In the preferred embodiment, RAM 910 is embedded memory which timing ASIC configuration module 410 (FIG. 5) loads with programmable timing information upon startup of camera 110. Because of the programmable nature of RAM 910, timing ASIC 226 may thus advantageously be used in conjunction with various different types of image sensors 224. In alternate embodiments, RAM 910 may also be readily configured by timing information from sources other than configuration module 410. For example, an external host computer (not shown) may provide information to configure RAM 910 via I/O interface 348.

RAM 910 comprises "N" vertical memory locations which range from vertical location zero 912 to vertical location "N" 916. Each vertical location 912 through 916 in RAM 910 contains a sequential series of digital values or "bits" which are divided into three basic functions. For example, bit 0 through bit n each provide an output signal having a binary value that corresponds to the associated bit stored in RAM 910. Bit zero through bit n are then provided to vertical output modules 954 which provide precise edge timing and generate signals V Out 1 through V Out X to synchronize and control image sensor 224.

In the preferred embodiment, bit n+1 through bit p of RAM 910 provide information for controlling selectors 840 through 850 in the horizontal timing generator 728. Specifically, bit n+1 and bit n+2 combine to form a selector control signal 940 which selects one of four inputs in selector 840. Bit n+3 and bit n+4 combine to form a selector control signal 942 which selects one of four inputs in selector 842. Bit n+5 and bit n+6 combine to form a selector control signal 944 which selects one of four inputs in selector 844. Bit n+7 and bit n+8 combine to form a selector control signal 946 which selects one of four inputs in selector 846. Bit n+9 and bit n+10 combine to form a selector control signal 948 which selects one of four inputs in selector 848. Bit p−1 and bit p combine to form a selector control signal 950 which selects one of four inputs in selector 850.

Although the FIG. 9 embodiment has six selector control signals 940 through 950, alternate embodiments may utilize greater or lesser numbers of selector controls signals, depending on the number of selectors present in horizontal timing generator 728. Selector control signals 940 through 950 are thus provided to horizontal timing generator 728 via line 742 to advantageously control selectors 840 through 850, in accordance with the present invention.

In the preferred embodiment, bit p+1 through bit q of RAM 910 provide an absolute pixel count to indicate the time position for sequential transitions to the sets of timing signal values stored in bit 0 through bit p of RAM 910. In practice, bit p+1 through bit q from a vertical location of RAM 910 are provided to a first input of comparator 934 via line 936. For example, vertical address generator 920 initially supplies an address to vertical location zero 912 in RAM 910. Comparator 934 thus receives bit p+1 through bit q from location zero 912 in RAM 910 via line 936.

The horizontal drive signal 858 (FIG. 8) from the horizontal timing generator 728 is provided to vertical address generator 920 via line 922, and to line counter 930 via line 928. Line counter 930 responsively provides a line count (based on HD 858) to a second input of comparator 934 via line 932. When the line count on line 932 equals the current value of bit p+1 through bit q on line 936, then comparator 934 outputs an binary "high" on line 924 to enable vertical address generator 920. When the enable signal on line 924 is high, vertical address generator 920 performs a binary up-count at the rising edge of the HD signal on line 922 and thus advances to the next sequential vertical memory location in RAM 910. Vertical address generator 920 supplies the current address to the read data port of RAM 910 via line 926.

In the foregoing manner, vertical address generator 920 allows digital values in vertical locations zero 912 through "N" 916 and selector control signals 940 through 950 to be sequentially read out of RAM 910 at specifically programmable times.

Figure 10:
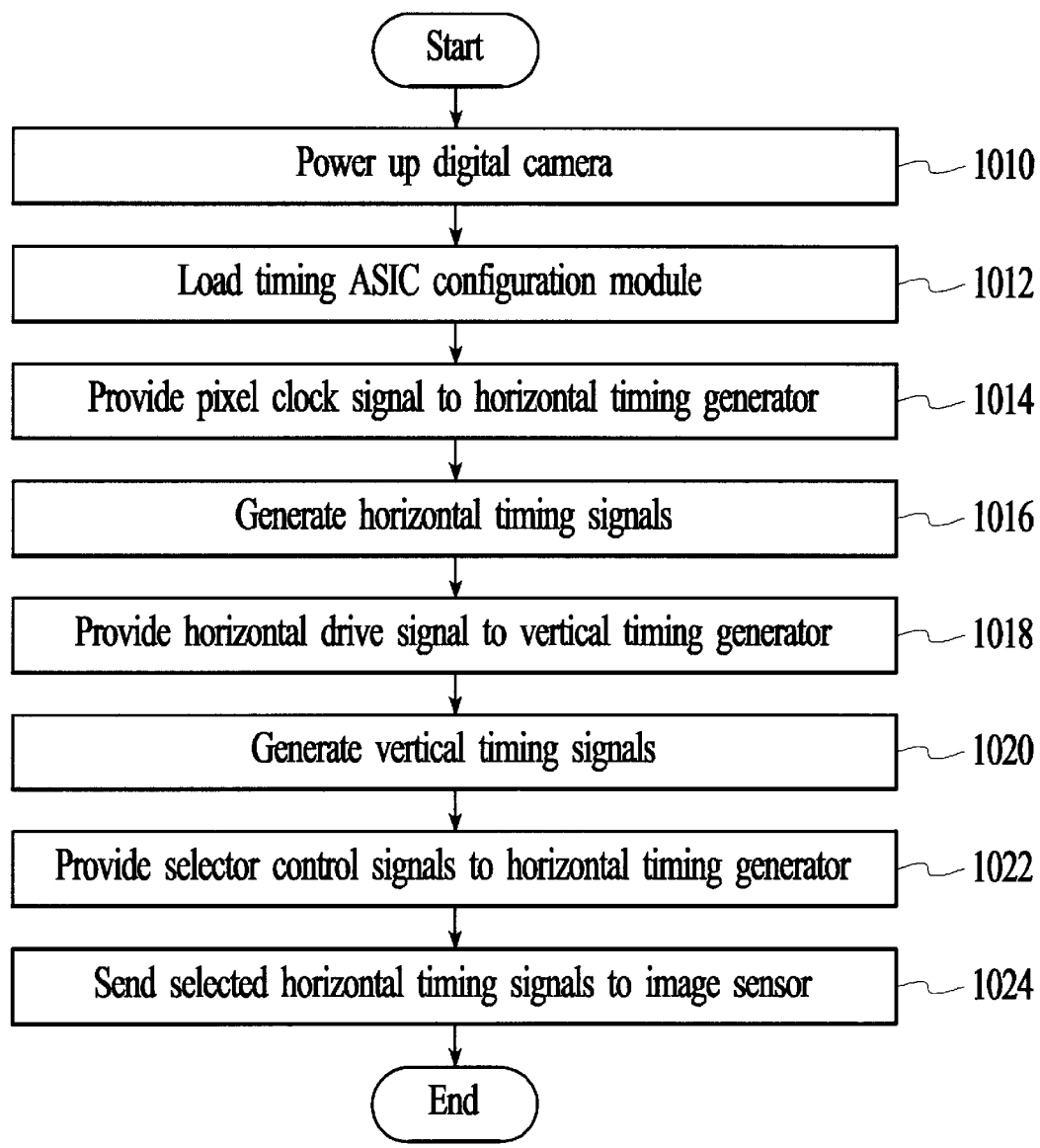
FIG. 10 is a flowchart of method steps for selectably generating horizontal timing signals, according to the present invention.

Referring now to FIG. 10, a flowchart of method steps for selectably generating timing signals is shown, in accordance with the present invention. Initially, in step 1010, a system user applies operating power to camera 110. Then, in step 1012, CPU 344 loads information from timing ASIC configuration module 410 into timing ASIC 226 to configure RAM 810 (in horizontal timing generator 728) and RAM 910 (in vertical timing generator 736).

Next, pixel clock generator 718, in step 1014, generates and provides a high-speed pixel clock signal to horizontal address generator 820 and to pixel counter 830 (both in horizontal timing generator 728). In response, horizontal timing generator 728, in step 1016, generates horizontal timing signals, including a horizontal drive signal 858.

In step 1018, horizontal timing generator 728 provides the horizontal drive signal 858 to vertical address generator 920 and to line counter 930 both in vertical timing generator 736. In response, vertical timing generator 736, in step 1020, generates vertical timing signals, including a series of selector control signals 940 through 950.

Next, in step 1022, vertical timing generator 736 provides the selector control signals 940 through 950 to respective selectors 840 through 850 in horizontal timing generator 728. Finally, horizontal timing generator 728, in step 1024, sends the selected timing signals to image sensor 224. In alternate embodiments, the timing signals may also control and synchronize various other components such as A/D converter 230.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for generating timing signals for controlling a charge-coupled image sensor in an electronic device that captures image data, comprising:
   a horizontal timing generator coupled to said electronic device, said horizontal timing generator including,
      a first random access memory for storing a first set of timing information, and
      selector devices coupled to said first set of timing information to generate said timing signals by selecting locations in said first random access memory;
   a vertical timing generator coupled to said electronic device, said vertical timing generator including,
      a second random access memory for providing a second set of timing information to selectively generate said timing signals from said first set of timing information; and
   a configuration module device for programming said first random access memory and said second random access memory.

2. The system of claim 1 wherein said vertical timing generator provides selector control signals which control said selector devices in said horizontal timing generator.

3. The system of claim 2 wherein said selector control signals are programmable by said configuration module device to modify said timing signal during use of said imaging device.

4. The system of claim 2 wherein said first set of timing information includes transition times and transition level values for timing pulses in said timing signals.

5. The system of claim 2 wherein said horizontal timing generator generates a horizontal drive signal in response to a pixel clock signal and then provides said horizontal drive signal to drive said vertical timing generator.

6. A method for generating timing signals for controlling a charge-coupled image sensor in an electronic device that captures image data, comprising the steps of:
   providing a horizontal timing generator coupled to said electronic device, said horizontal timing generator for,
      storing a first set of timing information in a first random access memory coupled to said electronic device, and
      generating said timing signals by selecting locations in said first memory using selector devices;
   providing a vertical timing generator coupled to said electronic device, said vertical timing generator for providing a second set of timing information in a second random access memory coupled to said electronic device;
   using said second set of timing information to selectively generate said timing signals from said first set of timing information; and
   providing a configuration module device for reprogramming said first random access memory and said second random access memory.

7. The method of claim 6 wherein said vertical timing generator provides selector control signals which control said selector devices in said horizontal timing generator.

8. The method of claim 7 wherein said selector control signals are reprogrammable by said configuration module to modify said timing signal during use of said imaging device.

* * * * *